US011227169B2

(12) United States Patent
Bolduc

(10) Patent No.: US 11,227,169 B2
(45) Date of Patent: Jan. 18, 2022

(54) SYSTEMS AND METHODS FOR GHOST OBJECT CLASSIFICATION

(71) Applicant: Continental Automotive Systems Inc., Auburn Hills, MI (US)

(72) Inventor: Andrew Phillip Bolduc, Royal Oak, MI (US)

(73) Assignee: Continental Automotive Systems, Inc., Auburn Hills, MI (US)

(\*) Notice: Subject to any disclaimer, the term of this patent is extended or adjusted under 35 U.S.C. 154(b) by 58 days.

(21) Appl. No.: 16/797,494

(22) Filed: Feb. 21, 2020

(65) Prior Publication Data

US 2021/0192235 A1 Jun. 24, 2021

Related U.S. Application Data

(60) Provisional application No. 62/951,424, filed on Dec. 20, 2019.

(51) Int. Cl.
*G06K 9/00* (2006.01)
*G01S 13/08* (2006.01)

(52) U.S. Cl.
CPC .......... *G06K 9/00805* (2013.01); *G01S 13/08* (2013.01); *G06K 9/00214* (2013.01)

(58) Field of Classification Search
CPC ...... G01S 17/931; G01S 17/894; G01S 17/04; G05D 1/0214; G05D 1/0291; G05D 1/0088; G06T 19/00
USPC .......................................................... 382/104
See application file for complete search history.

(56) References Cited

U.S. PATENT DOCUMENTS

2014/0294246 A1\* 10/2014 Osamura ................. G07C 5/00
382/107
2018/0285658 A1\* 10/2018 Gunther ................. H04W 4/38

FOREIGN PATENT DOCUMENTS

DE 10 2004 058844 A1 6/2006

OTHER PUBLICATIONS

International Search Report and the Written Opinion of the International Searching Authority dated May 3, 2021 for the counterpart PCT Application No. PCT/US2020/070933.

\* cited by examiner

*Primary Examiner* — Phuoc H Doan

(57) ABSTRACT

A system includes a sensor, which is configured to detect a plurality of objects within an area, and a computing device in communication with the sensor. The computing device is configured to determine that one of the plurality of objects is static, determine that one of the plurality of objects is temporary, determine a geometric relationship between the temporary object and the static object, and determine whether one of the plurality of objects is a ghost object based on the geometric relationship.

17 Claims, 5 Drawing Sheets

SYSTEMS AND METHODS FOR GHOST OBJECT CLASSIFICATION

CROSS-REFERENCE TO RELATED APPLICATION

This application claims priority to U.S. Provisional Application No. 62/951,424, which was filed on Dec. 20, 2019.

BACKGROUND

Smart city solutions achieve safety and comfort in mobility as the global trend towards urbanization leads to increases in traffic volumes and traffic complexities. Smart city solutions can benefit the mobility of citizens through ride-sharing, parking, automation, fleet management, intelligent street lighting, and safe intersections.

SUMMARY

A system according to an example of this disclosure includes a sensor configured to detect a plurality of objects within an area, and a computing device in communication with the sensor. The computing device is configured to determine that one of the plurality of objects is static, determine that one of the plurality of objects is temporary, determine a geometric relationship between the temporary object and the static object, and determine whether one of the plurality of objects is a ghost object based on the geometric relationship.

In a further example of the foregoing, the geometric relationship includes a first distance. The first distance is a distance from the temporary object to a point on the static object.

In a further example of any of the foregoing, the computing device is configured to compare the first distance to a second distance. The second distance is a distance from the ghost object to the point.

In a further example of any of the foregoing, the first distance being equal to the second distance is indicative of the ghost object not being present.

In a further example of any of the foregoing, the temporary object is a moving vehicle.

In a further example of any of the foregoing, the static object is a guardrail.

In a further example of any of the foregoing, the sensor is a radar sensor.

In a further example of any of the foregoing, the sensor is a LIDAR.

A method according to an example of this disclosure includes detecting, with a sensor, a plurality of objects within an area, determining that one of the plurality of objects is static, determining that a second of the plurality of objects is temporary within the area, determining a geometric relationship between the temporary object and the static object, and identifying that a third of the plurality of objects is a ghost object based on the geometric relationship.

In a further example of the foregoing, the temporary object is a moving vehicle.

In a further example of any of the foregoing, the static object is a guardrail.

In a further example of any of the foregoing, the geometric relationship includes a first distance. The first distance is a distance from the temporary object to a point on the static object.

In a further example of any of the foregoing, the identifying step includes comparing the first distance to a second distance. The second distance is a distance from the ghost object to the point.

In a further example of any of the foregoing, the first distance being equal to the second distance is indicative that the ghost object is not actually present.

In a further example of any of the foregoing, the sensor is a radar sensor.

In a further example of any of the foregoing, the sensor is a LIDAR.

A system according to an example of this disclosure includes a radar sensor configured to detect a plurality of objects within an area and a computing device in communication with the radar sensor. The computing device is configured to determine that one of the plurality of objects is static, determine that one of the plurality of objects is a moving vehicle, determine a geometric relationship between the moving vehicle and the static object, and determine whether one of the plurality of objects is a ghost object based on the geometric relationship. The geometric relationship includes a first distance. The first distance is a distance from the temporary object to a point on the static object. The computing device is configured to compare the first distance to a second distance. The second distance is a distance from the ghost object to the point, and the first distance being equal to the second distance is indicative of the ghost object not being present.

These and other features may be best understood from the following specification and drawings, the following of which is a brief description.

DETAILED DESCRIPTION

This disclosure relates generally to smart city solutions. In some examples, this disclosure relates more specifically to using radar to classify ghost objects within a field of view.

Applicant has recognized that some advantages of utilizing radars sensors for system solutions include: permanently installed static sensors, the ability to use commodity priced automotive radars, and consistent performance through a variety of weather and lighting conditions. Applicant has further recognized that some disadvantages of using radars include that the overall perception accuracy can be degraded due to multi-pass reflections of the radar signals, which results in object mirroring. A multi-pass reflection occurs when a radar signal reflects off of one or more objects during its route to a target object and back, which causes a distorted reading and may show a ghost object that is actually not present. These ghosts may be deceiving since they move and behave like the normal targets. Although the disclosed examples involve radar sensors, other range based sensors, such as LIDAR, may benefit from this disclosure.

Figure 1:
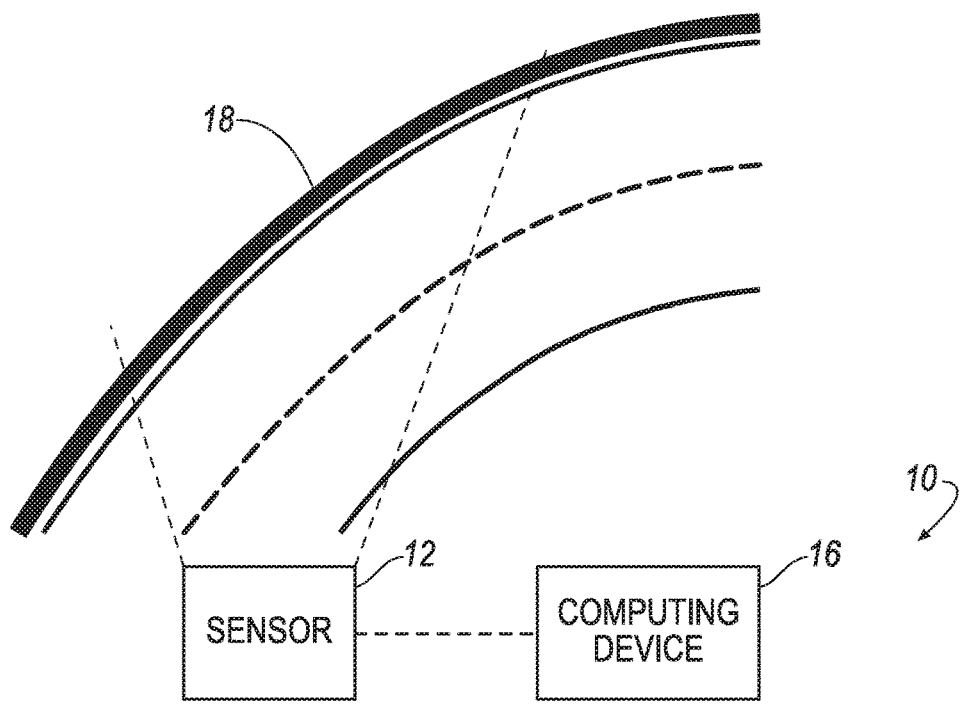
FIG. 1 schematically illustrates an example system for detecting objects in an area.

FIG. 1 schematically illustrates an example system 10 for detecting objects in an area, including one or more radar sensors 12 for detecting objects within an area. The sensor 12 is in communication with a computing device 16. The computing device 16 may be programmed with one or more algorithms to execute one or more of the methods or processes disclosed herein.

The radar sensor 12 may detect one or more static objects 18 within its field of view. The computing device 16 may determine that the objects 18 are static objects, such as by determining that an object exists at the same location through multiple cycles of sensing, i.e. multiple signals over time from the same location with 0 velocity. In some examples, as shown, the static object 18 is a guardrail. In some examples, the static object may be one or more of buildings, light poles, curbs, fire hydrants, foliage, or other types of infrastructure.

In some examples, the computing device 16 of the system 10 may include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

In some examples, the computing device 16 may include a hardware device for executing software, particularly software stored in memory, such as an algorithm for sensor calibration. The computing device 16 may include a custom made or commercially available processor, a central processing unit (CPU), an auxiliary processor among several processors associated with the computing device, a semiconductor based microprocessor (in the form of a microchip or chip set), or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

In some examples, the software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller can be configured to execute software stored within the memory, to communicate data to and from the memory, and to generally control operations of the computing device pursuant to the software. Software in memory, in whole or in part, is read by the processor, perhaps buffered within the processor, and then executed.

Figure 2:
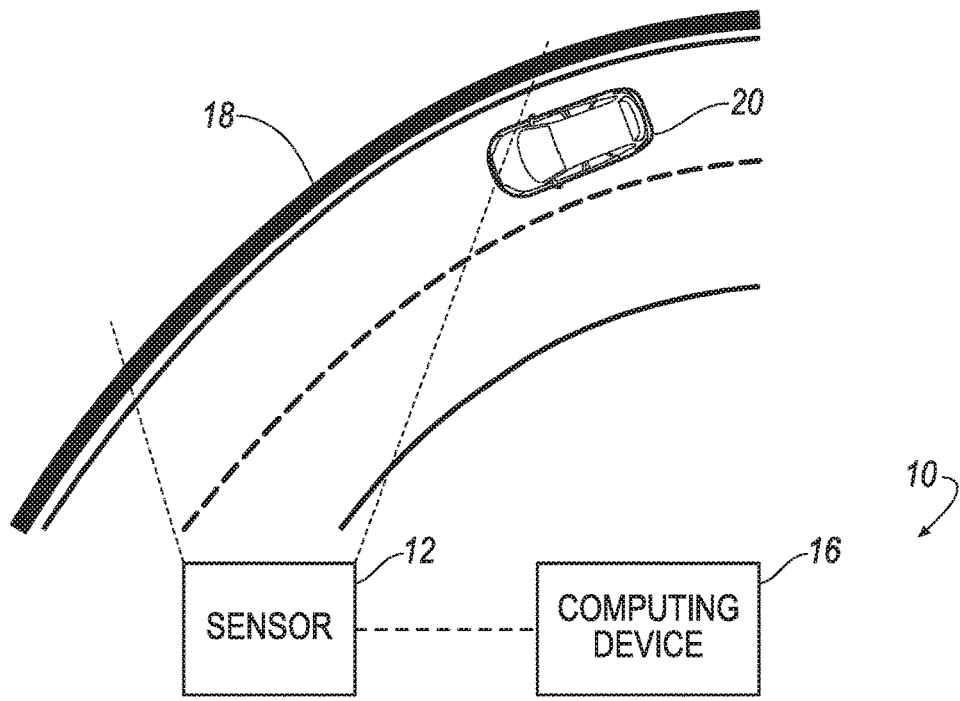
FIG. 2 schematically illustrates the example system of FIG. 1 with a temporary object entering the field of view.

FIG. 2 schematically illustrates a dynamic object 20 entering the field of view of the radar sensor 12. The sensor 12 detects that the dynamic object 20 is within the field of view. In some examples, as shown, the dynamic object 20 is a moving vehicle. The computing device 16 determines that the dynamic object 20 is temporary within the field of view, such as by measuring its speed. In some examples, the computing device 16 determines that the dynamic object 20 is temporary because it was not present during previous sensing cycles.

Figure 3:
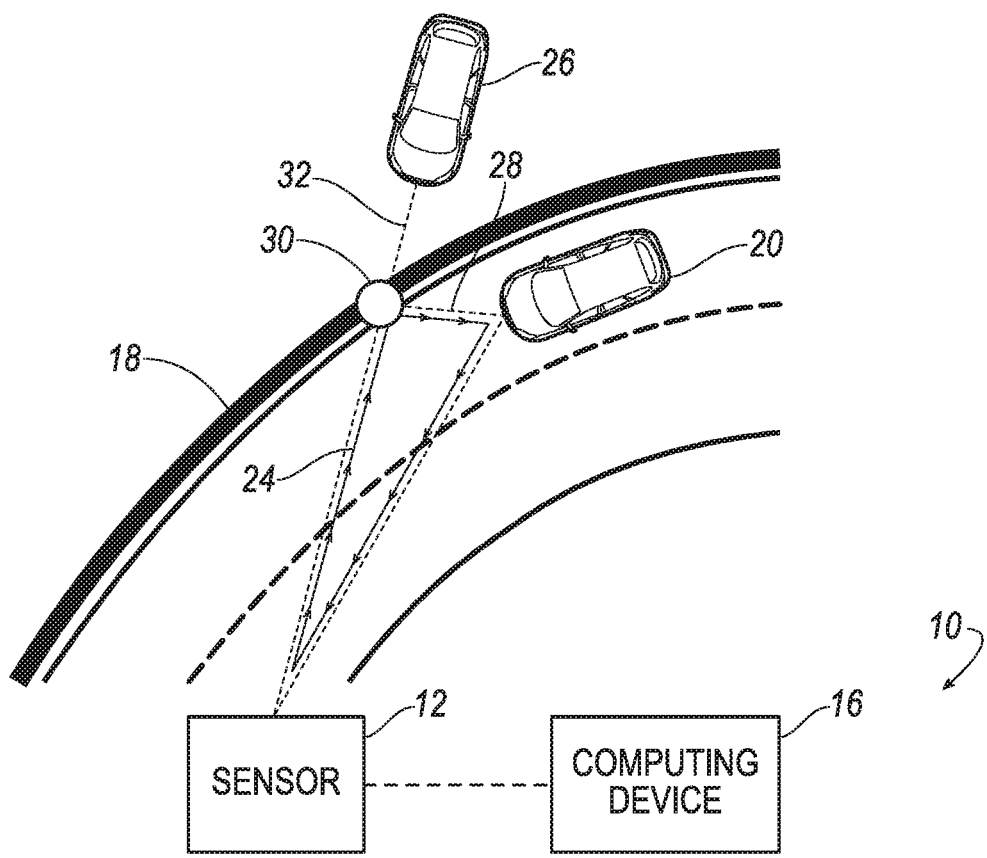
FIG. 3 schematically illustrates a multi-pass reflection within the example system of FIGS. 1 and 2.

FIG. 3 schematically illustrates the path 24 of a multi-pass reflection of a radar signal relative to the dynamic object 20. The signal travels from the radar sensor 12, reflects off the static object 18 toward the dynamic object 20, and reflects off the dynamic object 20 to the sensor 12. The multi-pass reflection results in a reading that shows a ghost object 26, i.e., an object that is not actually present.

The computing device 16 may determine a geometric relationship between the dynamic object 20 and the static object 18. In some examples, the geometric relationship includes a distance 28 from the dynamic object 20 to a point of reflection 30 on the static object 18. In the example shown, the point of reflection 30 is the point of reflection of the radar signals on the guardrail 18.

The computing device 16 may use the geometric relationship to determine that the object 26 is a ghost object. In some examples, if the distance 28 is the same as the distance 32 from the ghost object 26 to the point 30, it is indicative that the object 26 is a ghost object. In some examples, the ghost object may appear in the path of a straight line extending from the sensor 12 through the static object at the point 30. In some examples, the ghost object 26 is oriented toward the guardrail 18 in the same orientation as the dynamic object 20 is oriented toward the guardrail 18.

In some examples, the computing device 16 may consider additional factors to determine whether an object is a ghost object, such as one or more of: the object having a short lifetime within the field of view, the object having a lower strength than other detected objects, the object having the save velocity as another object also detected.

Using the geometric relationship and radar characteristics (such as radar cross-section, speed, number of reflections, etc.), ghost objects can be identified. Once ghost objects are classified, they can be considered in environment models to properly classify and track real objects. The systems disclosed can predict where multi-pass reflections may occur once a temporary object enters the radar field of view.

Figure 4:
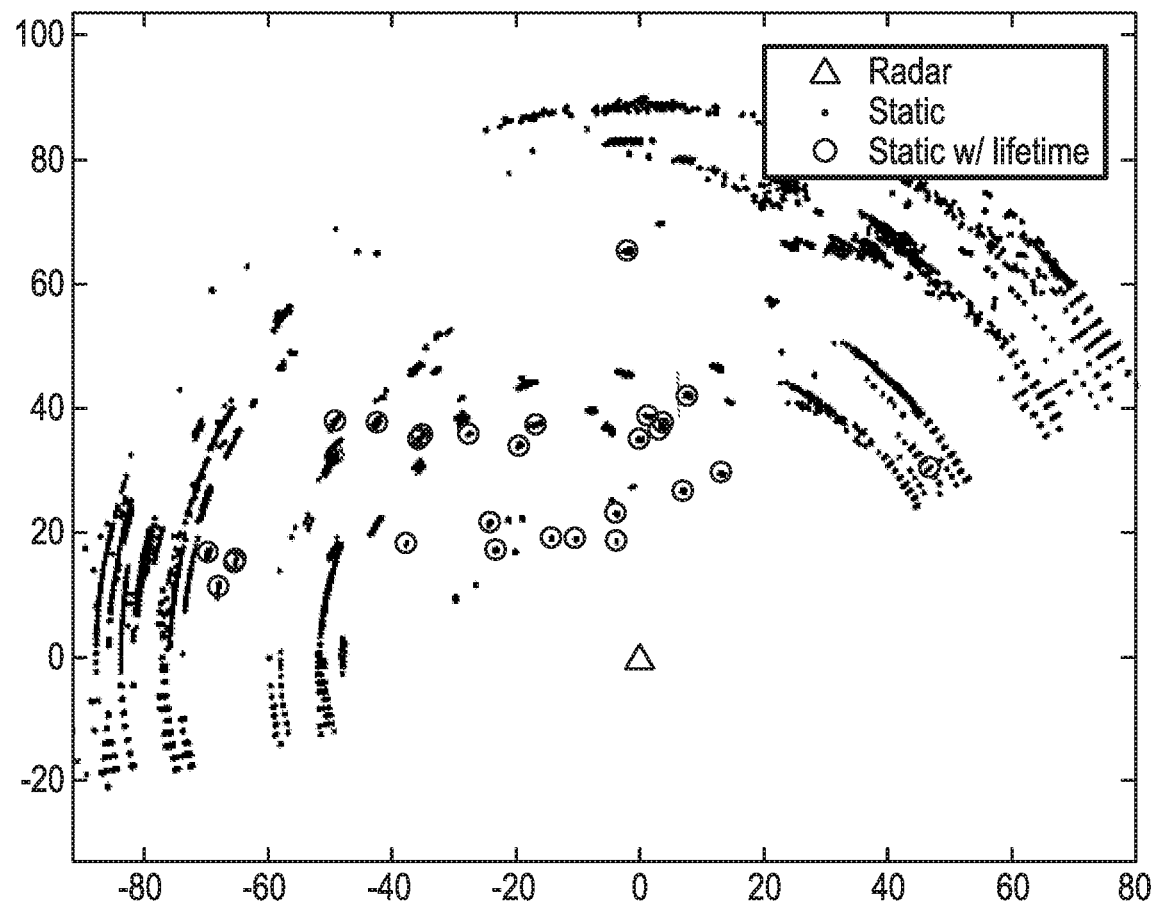
FIG. 4 illustrates a plot showing identified static objects within a field of view.

FIG. 4 shows a plot of identified static objects with lifetime in accordance with the disclosed systems and methods. In some examples, the static objects with lifetime are infrastructure within the environment.

Figure 5:
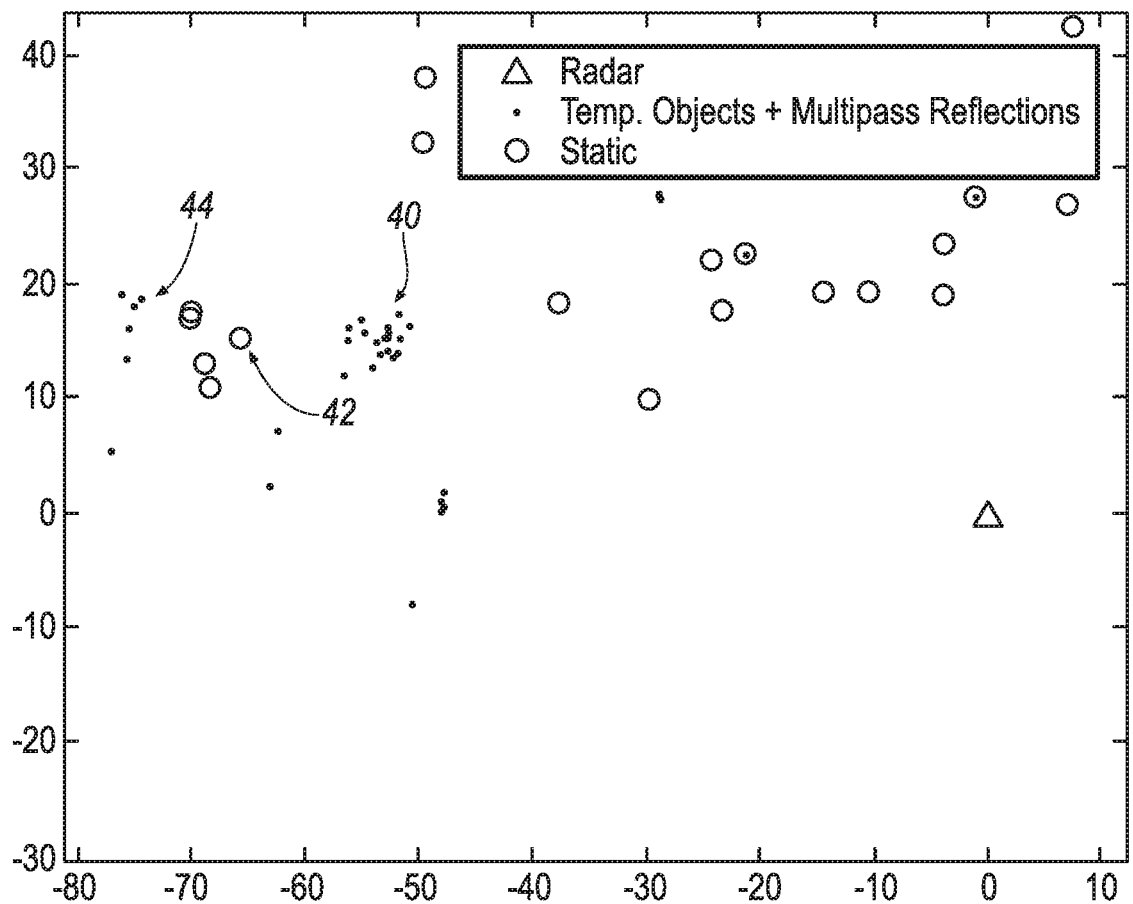
FIG. 5 illustrates a plot showing identified ghost objects caused by multi-pass reflections within a field of view.

FIG. 5 shows a plot of identified ghost objects caused by multi-pass reflections. As shown, the real object is indicated at 40, the infrastructure is located at 42, and the identified ghost objects are indicated at 44.

Figure 6:
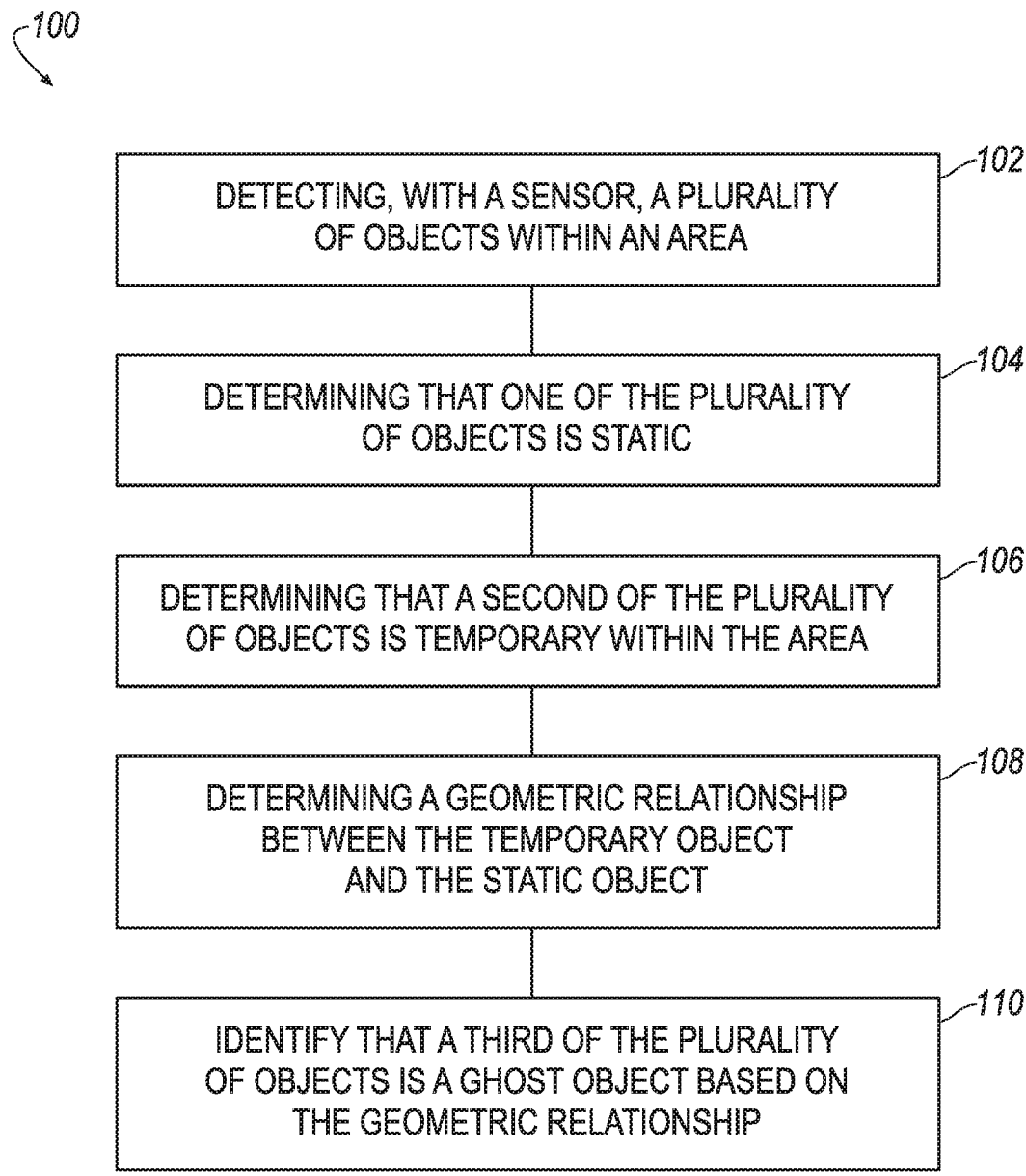
FIG. 6 illustrates a flowchart of an example method in accordance with this disclosure.

FIG. 6 illustrates a flowchart of an example method 100 in accordance with one or more examples of this disclosure. At 102, the example method 100 includes detecting, with a sensor, a plurality of objects within an area. At 104, the example method 100 includes determining that one of the plurality of objects is static. At 106, the example method 100 includes, determining that a second of the plurality of objects is temporary within the area, At 108, the example method 100 includes determining a geometric relationship between the temporary object and the static object. At 110, the example method 100 includes identifying that a third of the plurality of objects is a ghost object based on the geometric relationship.

In some examples, the geometric relationship includes a distance from the temporary object to a point on the static object. In some examples, the identifying step includes comparing the distance to the distance from the ghost object to the point.

An example system according to this disclosure can be said to include a sensor for detecting a plurality of objects within an area and a computing device in communication with the sensor. The computing device is programmed to determine that one of the plurality of objects is static, determine that one of the plurality of objects is temporary, determine a geometric relationship between the temporary object and the static object, and determine whether one of the plurality of objects is a ghost object based on the geometric relationship.

The present disclosure can provide enhanced identification of object mirrors ghost objects caused by radar multi-pass reflections allows fewer sensors to achieve the same performance, such as accuracy and coverage, as more and better (expensive) sensor systems.

The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples. These and other examples are within the scope of the following claims.

What is claimed is:

1. A system comprising:
    a sensor configured to detect a plurality of objects within an area, the plurality of objects comprising a first object, a second object, and a third object; and
    a processor configured to determine that the first object is a static object within the area, determine that the second object is a temporary object within the area, determine a geometric relationship between the temporary object and the static object, and determine that the third object is a ghost object that does not exist within the area based on the geometric relationship.

2. The system as recited in claim 1, wherein the geometric relationship is a distance from the temporary object to a point on the static object.

3. The system as recited in claim 2, wherein the processor is configured to compare the first distance to a second distance from the ghost object to the point.

4. The system as recited in claim 3, wherein the processor determines that the third object is the ghost object based on the first distance being equal to the second distance.

5. The system as recited in claim 4, wherein the temporary object is a moving vehicle.

6. The system as recited in claim 5, wherein the static object is a guardrail.

7. The system as recited in claim 1, wherein the sensor is a radar sensor.

8. The system as recited in claim 1, wherein the sensor is a LIDAR.

9. A method of determining a ghost object detected by a sensor, the method comprising:
    determining a first object detected within an area by the sensor is a static object within the area;
    determining a second object detected by the sensor is a temporary object within the area;
    determining a geometric relationship between the temporary object and the static object; and
    determining a third object detected by the sensor is the ghost object within the area based on the geometric relationship.

10. The method as recited in claim 9, wherein the geometric relationship is a distance from the temporary object to a point on the static object.

11. The method as recited in claim 10, wherein determining the third object detected by the sensor is the ghost object comprises comparing the first distance to a second distance from the ghost object to the point.

12. The method as recited in claim 11, wherein determining the third object detected by the sensor is the ghost object comprises determining the third object is the ghost object based on the first distance being equal to the second distance.

13. The method as recited in claim 12, wherein the temporary object is a moving vehicle.

14. The method as recited in claim 13, wherein the static object is a guardrail.

15. The method as claimed in claim 12, further comprising detecting with the sensor the first object, the second object, and the third object.

16. The method as recited in claim 9, wherein the sensor is a radar sensor.

17. The method as recited in claim 9, wherein the sensor is a LIDAR.

* * * * *